PHOTOMODULATING CIRCUIT USING TWO ALTERNATELY
ENERGIZED LIGHT SOURCES
Filed Oct. 2, 1961

INVENTOR.
RICHARD T. GUCWA
BY Arthur L. Nelson
Frank C. Parker
ATTORNEYS 3,191,039
Patented June 22, 1965

3,191,039

PHOTOMODULATING CIRCUIT USING TWO ALTERNATELY ENERGIZED LIGHT SOURCES

Richard T. Gucwa, Rochester, N.Y., assignor to Bausch & Lomb Incorporated, Rochester, N.Y., a corporation of New York Filed Oct. 2, 1961, Ser. No. 142,402
9 Claims. (Cl. 250—208)

This invention relates to a modulating circuit and more particularly to a photomodulating circuit minimizing the simultaneously off period of the lamps.

This application is an improvement over the high impedance input circuit covered under a copending application of the same assignee, Serial Number 132,871, filed August 21, 1961. Although this invention is adapted to a circuit as illustrated in the copending application, the inventor does not wish to limit the application to such a circuit.

It is an object of this invention to provide a high impedance input circuit having photo-conduction for substantially the full cycle of the modulated output signal.

It is another object of this invention to provide a photomodulating circuit minimizing the simultaneously off period of the light sources.

It is a further object of this invention to provide a modulating circuit having photo-conductivity for substantially the full cycle of the modulated signal.

The objects of this invention are accomplished by employing two half-wave rectifier circuits having a filtering means connected across a source of alternating current. A lamp is associated with each of the half-wave rectifiers to provide illuminating during alternate half cycles of the alternating current. The filtering network delays the voltage drop across each of the lamps and lengthens the illumination period of each of the two lamps. A capacitor is connected intermediate of the resistive elements of the filtering network of each of the half-wave rectifiers to extinguish the first lamp prior to firing of the second lamp and vice versa. The effect of this combination is to provide substantially 180° illumination of each of the lamps and substantially continuous illumination of one or the other lamp for the full cycle of the source of alternating current.

As illustrated a photoconductive cell is associated with each of the lamps. The photoconductive cells have a common output lead and separate input leads, one of which could be grounded. As one of the photoconductive cell is conducting, a low resistance to flow of current is present in the cell, thereby transmitting a signal to the output terminal. With an illumination of the light source for substantially 180° in the cycle, each of the photoconductive cells impresses its input signal on the output terminal for substantially the full 180° of the cycle.

The foregoing and other objects of the invention will become apparent in the following detailed description of the representative embodiments enclosed in the drawings.

Figure 1:
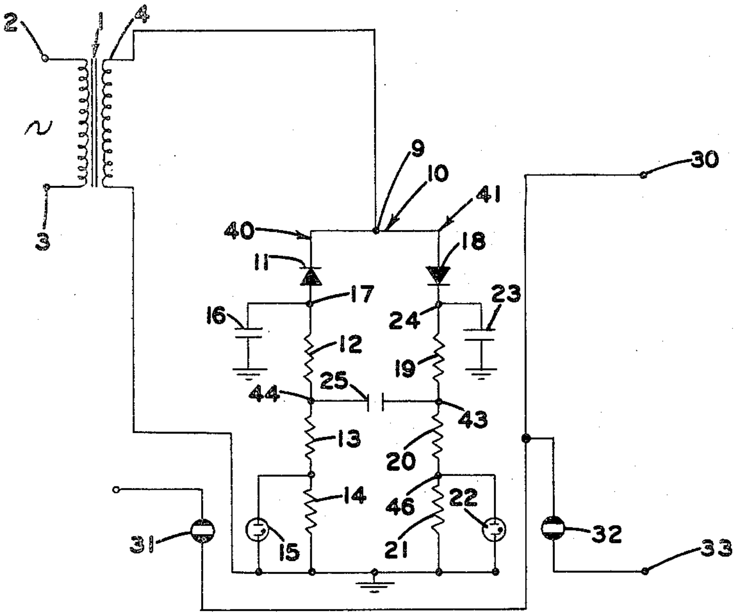
FIG. 1 is a circuit diagram of the modulating circuit.

Referring to FIG. 1 the electrical circuit is shown. Although the photomodulating circuit as illustrated is particularly well adapted for a null seeking potentiometer, the inventor does not wish to limit the invention to this use. The circuit adapts itself readily to any use requiring a high impedance input and also the advantages derived from minimizing the simultaneous off-position of the two light sources.

The primary winding of transformer 1 is connected by the terminals 2 and 3 to a source of alternating current. The junction 9 forms a connection for the end of the photomodulator circuit 10. The lighting circuit 10 is bridged between ground potential and junction 9.

The lighting circuit 10 comprises two half-wave rectifiers, each connected in series with a lamp. Each of the half-wave rectifiers is connected with a filtering network including capacitive and resisting elements.

The diode 11 is connected in series with the resistors 12, 13 and 14. The resistor 14 is connected on its opposite end to the ground potential. A neon lamp 15 is connected to ground and a point intermediate to resistors 13 and 14, thereby placing the neon lamp 15 in parallel with the resistor 14. The capacitor 16 is connected to a ground potential and also on its opposite side to a point intermediate the diode 11 and the resistor 12. The capacitor 16 is primarily a filtering capacitor, which delays the voltage drop on the connection 17 adjacent the diode and resistor 12.

A second half-wave rectifier is connected in parallel with the first, and includes the diode 18, connected in series with the resistors 19, 20 and 21. The resistor 21 is connected on the other end to a ground potential. The neon lamp 22 is connected in parallel with resistor 21 to a point intermediate the resistors 20 and 21 and to a ground potential.

Figure 2:
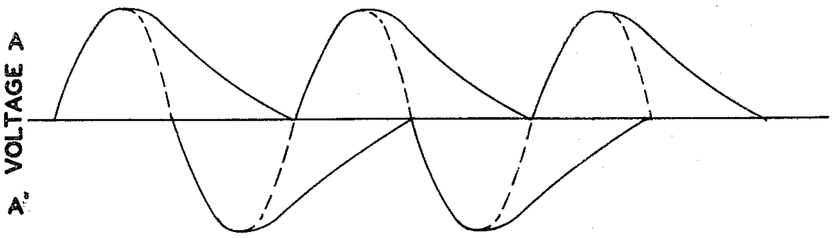
FIG. 2 is a graph illustrating the wave forms of the voltage at points 24 and 17 adjacent to the diodes in the half-wave rectifier circuits.

The filtering capacitor 23 is connected to a point 24 intermediate of the diode 18 and the resistor 19. The capacitor delays the voltage change on the terminal 24 as indicated in FIG. 2.

A capacitor 25 is connected between the two half-wave rectifier circuits at points intermediate resistors 12 and 13 and with its opposite side connected to the junction between resistors 19 and 20. The capacitor 25 causes the voltage on the two sides of the half-wave rectifiers to follow each other to a limited extent, thereby cutting off the first tube at a time just prior to firing of the second tube.

The output terminal 30 is connected to photoconductive cells 31 and 32. A first input is connected through the photoconductive cell 32 to the output. The photoconductive cell 32 is mounted adjacent to the neon lamp 22 and is conductive to a first input signal when the lamp 22 is illuminated. An extremely high resistance is presented to this signal when the lamp 22 is dark.

The photoconductive cell 31 is mounted adjacent to the neon lamp 15 and conducts a second input signal through the photoconductive cell 31 to the output when the lamp 15 is illuminated. The output is a signal modulated at the frequency of the source of alternating current.

Referring to FIG. 2, a graph illustrates the voltage on the junctions 24 and 17. The solid line wave form A illustrates the potential on the terminal 24 and the solid line wave form A' illustrates the potential on the terminal 17. The dash line sinusoidal wave illustrates the voltage wave form created by the secondary winding 4. The solid line, wave form A is caused by the filtering network of the capacitor 23, and the resistors 19, 20 and 21 connected in parallel to ground potential. The capacitor 23 maintains a residual charge which discharges through these resistors to ground. It can be seen that the wave form created by the filtering network in the rectifier circuit 40 delays the voltage drop on the terminal 24, due to the charge on the capacitor 23.

The filtering network in rectifier circuit 40 also creates a wave form on the terminal 17 as indicated by the solid line A'. The wave form created by the secondary winding 4 is indicated by the dash line.

The rectifier circuits 40 and 41 operate in a like manner, except that they operate on alternate half cycles of the alternating current. The capacitors 16 and 23 maintain a lighted condition of the neon lamps 15 and 22 respectively, for a greater length of time than would ordinarily be true if they were not present in the circuit. The charge in these capacitors would cause a lighted condition of the neon lamps for substantially more than the full half cycle of the alternating current. It is not desirable, however, to have both lamps lighted simultaneously, and, therefore, the capacitor 25 is connected between the intermediate junction 44 of the resistors 12 and 13 and also junction 43 intermediate the resistors 19 and 20. The capacitor 25 limits the maximum voltage between the junctions 43 and 44 and prevents a lighted condition of the neon lamps for more than the full half cycle.

Figure 3:
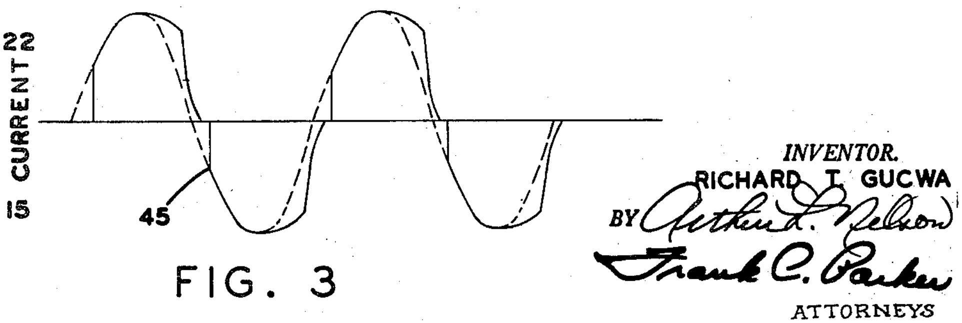
FIG. 3 is a graph of the current on the two lamps.

Referring to FIG. 3, the currents through the lamps 15 and 22 are indicated by the solid line. The current which would be created by a resistive load across the secondary winding 4 is indicated by the dash line. The currents for the lamp 22 are indicated as positive, and the currents for the lamp 15 are indicated as negative. Referring to lamp 22, the current indicated by the solid line rises abruptly at a point where the lamp 22 fires and beyond this point is illuminated. The current on the lamp 22 continues to increase with the applied voltage increases. As the applied voltage decreases, the charge maintained by the capacitor 23 causes a continuing greater than normal voltage on the neon lamp 22, as indicated by the solid line. As the applied voltage moves negatively, the capacitor 25 connected to junction 44 causes junction 43 to decrease in potential and cutoff lamp 22.

Subsequently to extinguishing of lamp 22, the lamp 15 is lighted. The lamp 15 is lighted at a point approximately equal to point 45 as indicated on the graph. The cycle repeats itself on the negative portion of the wave as illustrated in FIG. 3.

As pointed out, the filtering network of the capacitors 16 and 23 and their corresponding resistors, causes a leveling of the voltage and a continuation of voltage impressed on the corresponding lamp as the sine wave voltage is impressed on the circuit. The capacitor 25 temporarily limits the maximum voltage between the junctions 44 and 43 and thereby causes a lowering of voltage on the lamp which is lighted and to extinguish the lighted lamp prior to the lighting of the second lamp. The purpose of the circuit is to minimize the simultaneous off period of the lamps. It is also the purpose of the circuit to maintain a maximum conduction period of each of the two photoconductive cells.

It is unnderstood that the above-described arrangement is illustrative and descriptive in setting forth the invention covered herein. Other modifications illustrating and describing this invention may be devised without departing from the spirit of the invention. The following attached claims are considered to cover the invention as described above.

What is claimed is:

1. A photomodulating circuit comprising, a source of alternating current, two unidirectional conducting lighting circuits including light elements connected in opposite polarity across said source of alternating current, a filtering means in each of said circuits including capacitive and resistive elements connected in each of said lighting circuits delaying voltage drop during the conductive period, a voltage limiting capacitor connected between each of said lighting circuits for temporarily limiting the maximum voltage differential between said limiting circuits and cutting off the illuminated light element prior to illuminating the unlighted element.

2. A photomodulating circuit comprising, a source of alternating current, a first half-wave rectifier circuit including a filtering capacitor and a voltage producing resistor connected across said source of alternating current, a first light source connected across said resistor for illumination on half cycles of said source of alternating current, a second half-wave rectifier circuit including a filtering capacitor and a voltage producing resistor connected in reverse polarity to said first half-wave rectifier circuit across said source of alternating current including a second light source connected across said resistor for illumination on alternate half cycles of said source of alternating current, said filtering capacitors maintaining a delay in voltage drop on the corresponding light sources to increase the light period, a capacitive means connecting each of said filtering networks to limit the maximum differential voltage between said light source thereby cutting off the lighted light source prior to illumination of the dark light source.

3. A photomodulating circuit comprising, a source of alternating current, two half-wave rectifier circuits connected in reverse polarity across said source of alternating current including, a filtering capacitor and a voltage producing resistance connected in each of said half-wave rectifier circuits, a lamp connected across a portion of the resistance in each of said half-wave rectifier circuits, capacitive means connecting similar points on said resistances in each of said half-wave rectifier circuits temporarily limiting the maximum differential voltage between lamps in said rectifier circuits for more closely coordinating cutoff and lighting of alternate lamps, a photosensitive cell associated with each of said lamps for generating a photomodulated signal.

4. A photomodulating circuit comprising, two rectifier circuits connected in reverse polarity across a source of alternating current, a filtering network connected in each of said rectifier circuits to maintain a more constant voltage level during conduction periods including resistive and capacitive components, a light source connected across a portion of each of said resistive components in each of said filtering networks for illumination on alternate half cycles of said source of alternating current, capacitive means connected to said two filtering networks temporarily limiting the maximum voltage different between light source and sharply dropping voltage at the end of the conduction period, a photosensitive element mounted adjacent to each of said light sources for conduction of a signal during illumination intervals of the adjacent light source.

5. A photomodulating circuit comprising in combination, a source of alternating current, a undirectional conducting circuit including a rectifier means and a filtering means for maintaining high voltage level during the conduction period, a light source connected to said unidirectional circuit for illumination on half cycles of said source of alternating current, a second undirectional conducting circuit including a second rectifier means and filtering means for maintaining high voltage level during conduction period, a second light source connected in said second undirectional circuit for illumination on alternate half cycles of said source, a voltage limiting means connected between said light sources to limit maximum voltages between said light sources and drastically lower voltage at the end of the conduction period, a photoconductive cell associated with said first light source, and a second photoconductive cell associated with said second light source, a signal input terminal connected with each of said photoconductive cells, each of said photoconductive cells being adapted for transmitting a signal to the output terminal by photoconduction for substantially the full half cycle of said source of alternating current.

6. A photomodulating circuit comprising, a source of alternating current, a first half-wave rectifier including a filtering capacitor and a voltage producing resistor connected across said source of alternating current, a first light source connected across said resistor for illumination on half cycles of said source of alternating current, a second half-wave rectifier including a filtering capacitor and a voltage producing resistor connected in reverse polarity to said first rectifier across a source of alternating current including, a second light source connected across said resistor for illumination on alternate half cycles of said source of alternating current, a photosensitive element adjacent each of said light sources and adapted to conduct alternate input signals to a terminal means responsive to illumination of said light sources, said filtering capacitors maintaining a delay in the voltage drop on the corresponding light sources to increase the light period, a capacitive means connecting each of said filtering networks to limit the maximum differential voltage between said light source thereby cutting off the lighted light source prior to illumination of the dark light source.

7. A photomodulating circuit comprising, a source of alternating current, two half-wave rectifier units connected in parallel and reverse polarity across said source of alternating current, a filtering network in each of said rectifier units comprising a capacitive and resistive means for delaying the voltage drop during periods of conduction, a lamp connected to each of said filtering networks for illumination during substantially the full half-wave of the cycle of alternating current, a photosensitive element adjacent each of said lamps for applying alternate input signals to a terminal means responsive to illumination of said lamps, capacitive means connecting each of said filtering networks for limiting the maximum differential voltage between the filtering networks and thereby cutting off the lighted lamp slightly prior to illumination of the second dark lamp.

8. A photomodulating circuit comprising, a source of alternating current, at least two identical filtering circuits each including a diode connected in reverse polarity across said source of alternating current including, a filtering capacitor and series connected resistors connected in each of said circuits, a lamp connected across one of said resistors in each of said circuits, capacitive means connecting junctions of like resistors in each of said circuits temporarily limiting the maximum differential voltage between said lamps in said circuits, at least one photosensitive cell associated with each of said lamps for transmitting a photomodulating signal, an output terminal connected to the photosensitive cells for receiving the photomodulating signal.

9. A photomodulating circuit comprising, a source of alternating current, at least two unidirectional conducting lighting circuits of dissimilar polarity connected across said source of alternating current, a filtering means in each of said lighting circuits temporarily delaying voltage drop on said lighting circuits and maintaining a lighted condition of said circuit during substantal half of the alternating current cycle, a voltage limiting means connected intermediate said lighting circuits temporarily limiting the maximum voltage differential between said lighting circuits and sharply dropping voltage on the end of a lighted condition of said circuit, a photoconductive cell associated with each of said lighting circuits for providing a photo switching means.

References Cited by the Examiner

UNITED STATES PATENTS

| | | | |
|---|---|---|---|
| 2,119,870 | 6/38 | Rosenberg | 250—208 X |
| 2,125,073 | 7/38 | Knowles | 315—155 |
| 2,191,795 | 2/40 | Kolb | 250—208 X |
| 2,665,068 | 1/54 | Williams | 315—84.5 X |
| 2,782,344 | 2/57 | Sharin | 315—229 X |
| 3,011,094 | 11/61 | Kapteyn | 315—133 X |

RALPH G. NILSON, *Primary Examiner.*